(12) United States Patent
Chittella (10) Patent No.: US 9,143,825 B2
(45) Date of Patent: Sep. 22, 2015

(54) SYSTEMS, METHODS AND DEVICES TO REDUCE CHANGE LATENCY IN PLACESHIFTED MEDIA STREAMS USING PREDICTIVE SECONDARY STREAMING

(75) Inventor: Kiran Chittella, Bangalore (IN)

(73) Assignee: Sling Media PVT. LTD., Banglore (IN)

( * ) Notice: Subject to any disclaimer, the term of this patent is extended or adjusted under 35 U.S.C. 154(b) by 0 days.

(21) Appl. No.: 12/951,536

(22) Filed: Nov. 22, 2010

(65) Prior Publication Data
US 2012/0131627 A1    May 24, 2012

(51) Int. Cl.
| H04N 7/173 | (2011.01) |
| H04N 21/438 | (2011.01) |
| H04N 21/2381 | (2011.01) |
| H04N 21/431 | (2011.01) |
| H04N 21/45 | (2011.01) |
| H04N 21/462 | (2011.01) |
| H04N 21/6379 | (2011.01) |

(52) U.S. Cl.
CPC ....... *H04N 21/4384* (2013.01); *H04N 21/2381* (2013.01); *H04N 21/4316* (2013.01); *H04N 21/4532* (2013.01); *H04N 21/4621* (2013.01); *H04N 21/6379* (2013.01)

(58) Field of Classification Search
CPC .......... H04N 21/2381; H04N 21/4316; H04N 21/4384; H04N 21/4532; H04N 21/4621; H04N 21/6379
USPC ........................................................ 725/109
See application file for complete search history.

(56) References Cited

U.S. PATENT DOCUMENTS

| 5,886,746 A | 3/1999 | Yuen et al. |
| 6,115,080 A | 9/2000 | Reitmeier |
| 6,510,553 B1 * | 1/2003 | Hazra .............................. 725/87 |
| 6,519,011 B1 * | 2/2003 | Shendar ........................ 348/731 |
| 6,532,593 B1 * | 3/2003 | Moroney ....................... 725/142 |
| 7,532,253 B1 | 5/2009 | Greenberg |

(Continued)

FOREIGN PATENT DOCUMENTS

| WO | 2006041784 A2 | 4/2006 |
| WO | 2009095080 A1 | 8/2009 |
| WO | 2010027784 A2 | 3/2010 |

OTHER PUBLICATIONS

Yao, Kevin "Apparatus, Systems and Methods for Pre-Tuning a Second Tuner in Anticipation of a Channel Surfing Activity," U.S. Appl. No. 12/815,759, filed Jun. 15, 2010.

(Continued)

*Primary Examiner* — Dominic D Saltarelli
(74) *Attorney, Agent, or Firm* — Ingrassia Fisher & Lorenz, P.C.

(57) ABSTRACT

Systems, methods and devices are provided to reduce change latency and/or to provide a picture-in-picture (PIP) feature within a placeshifted media stream. As the viewer receives a primary stream containing selected programming, secondary programming that is likely to be of interest to the user is predicted. A secondary stream containing the predicted content is obtained at the same time as the primary stream selected by the user. The secondary stream may be of lower quality than the primary stream to preserve network bandwidth. If the user subsequently selects the predicted secondary content, the previously-obtained content can be quickly provided as an output to the display. Alternately, the primary and secondary streams may be simultaneously output to the display in PIP or another manner.

19 Claims, 3 Drawing Sheets

(56) References Cited

U.S. PATENT DOCUMENTS

| | | | |
|---|---|---|---|
| 7,861,272 B2 * | 12/2010 | Russ et al. | 725/74 |
| 2004/0001500 A1 | 1/2004 | Castillo | |
| 2004/0003399 A1 | 1/2004 | Cooper | |
| 2004/0184523 A1 | 9/2004 | Dawson et al. | |
| 2004/0194134 A1 | 9/2004 | Gunatilake et al. | |
| 2008/0244665 A1 | 10/2008 | Bowen et al. | |
| 2008/0263621 A1 | 10/2008 | Austerlitz et al. | |
| 2011/0016484 A1 | 1/2011 | Choi | |

OTHER PUBLICATIONS

European Patent Office, International Searching Authority, "International Search Report" mailed Apr. 2, 2012; International Appln. No. PCT/IN2011/000800, filed Nov. 17, 2011.

* cited by examiner

SYSTEMS, METHODS AND DEVICES TO REDUCE CHANGE LATENCY IN PLACESHIFTED MEDIA STREAMS USING PREDICTIVE SECONDARY STREAMING

TECHNICAL FIELD

The following discussion generally relates to placeshifting of media content over digital networks.

BACKGROUND

"Placeshifting" refers to shifting the viewing location of television or other media content from one place (e.g., a home television) to another. Many commercially-available placeshifting devices and systems now allow viewers to placeshift content from their home televisions, television receivers, set top boxes (STBs), digital video recorders (DVRs) and/or the like to any other locations where network access can be obtained. Media content can be "placeshifted", for example, by providing a streaming media connection from the placeshifting device to a mobile phone, portable computer and/or other media player that may be located in a different room, building or other remote place that is nevertheless accessible via a local area and/or wide area network. Typically, the media player controls the remotely-located media source to select programming, change channels, fast forward/rewind, and so forth.

Generally speaking, it is desired that users have the same experiences with placeshifted content that they would have if they were located in front of their actual televisions. In practice, however, this is difficult to achieve. The realities of video encoding, network communications and other factors can often create latency that detracts from the user experience. If a user changes a channel within a placeshifted media stream, for example, it may take several seconds until programming from the new channel is obtained and a new stream with the content from the newly-selected channel can be provided. During this time, the user simply waits until the content is available. This delay can be particularly frustrating during "channel surfing", in which the user would like to scan the content provided on multiple channels, but must wait until the placeshifted media stream can be updated for each channel change commanded by the user.

It is therefore desirable to create systems and methods that are able to reduce latency that occurs upon channel changes or the like. Other desirable features and characteristics will become apparent from the subsequent detailed description and the appended claims, taken in conjunction with the accompanying drawings and this background section.

BRIEF SUMMARY

Systems and methods are described for reducing change latency in placeshifted media streams. In an exemplary embodiment, a secondary program that is at least somewhat likely to be selected for future viewing is chosen, encoded and provided to the media device at the same time that the user-selected content is provided. If the user does indeed select the second program for viewing, the media device is able to quickly output the readily available second program to the display without requesting a new stream from the placeshifting device. Similar constructs may additionally or alternately be used to provide a picture-in-picture (PIP) feature or the like.

Examples of many different embodiments and implementations are described herein. Some embodiments provide methods executable by a media device that is associated with a display and that communicates with a placeshifting device via a network. The method suitably comprises receiving a first user input at the media device that selects a media stream available from the placeshifting device for viewing on the display; predicting, by the media device, a second media stream available from the placeshifting device that is different from the selected media stream; simultaneously obtaining the selected media stream and the second media stream from the placeshifting device via the network; outputting the selected media stream to the display; and, in response to a subsequent second user input that selects the second media stream, outputting the second media stream to the display.

Other embodiments provide methods executable by a media device that is associated with a display and that communicates with a placeshifting device via a network. The method suitably comprises receiving a first input from a user at the media device that selects a media program available from the placeshifting device for viewing on the display; predicting, by the media device, a second media program available from the placeshifting device, wherein the second media program is different from the selected media program and is chosen based upon prior actions by the user; simultaneously obtaining a first placeshifted media stream that encodes the selected media program and a second placeshifted media stream that encodes the second media program from the placeshifting device via the network; simultaneously decoding the selected media program and the second media program from the first and second media streams, respectively; outputting the selected media program to the display; while the selected media program is being output to the display, receiving a second input from the user that selects the second media program; and, in response to the second input from the user, outputting the previously-decoded second media program to the display on a substantially immediate basis.

Still other embodiments provide a media device that communicates with a placeshifting device via a network. The media device suitably comprises a first interface to the network, a second interface to a display, and a processor. The processor is coupled to the first and second interfaces, and is configured to process a first input from a user that selects a first media stream available from the placeshifting device, to predict a second media stream available from the placeshifting device that is different from the first media stream and that is likely to be of interest to the user, to simultaneously obtain both the first media stream and the second media stream from the placeshifting device via the network, to output the first media stream to the display, and to output the obtained second media program to the display in response to a second input from the user that selects the second media stream.

These and other examples, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, latency in a placeshifted media stream is reduced by providing two simultaneous streams of media content: a primary stream with the content selected by the viewer/user, and a simultaneous secondary stream that carries programming that is likely to be of near-term interest to the viewer. The content of the secondary stream may be predicted based upon patterns in the user's behavior, the program selected by the user, historical or other data about the user, and/or any other factors, as described more fully below. The secondary content that is predicted to be of interest is then obtained at the same time as the primary content; the secondary content is simply cached for an appropriate period of time, or otherwise stored until it is requested by the user. When the user subsequently selects the predicted secondary content for viewing, the media player has already received the selected programming so it is available for relatively immediate playback, thereby greatly reducing the time and effort to provide the content to the user. If the user selects content other than the predicted secondary content, the user may experience latency while the newly-selected content is obtained. Various embodiments may use the new content selection, however, to identify patterns in the user's behavior or to otherwise improve future predictions of secondary content that would be of interest to the viewer.

In some implementations, the secondary content is encoded or otherwise provided with a lower quality (e.g., a lower resolution, bit rate, frame rate and/or the like) in comparison to the primary content, thereby reducing (if not eliminating) any adverse effects upon network bandwidth that could otherwise affect delivery or viewing of the primary stream. If the user is receiving the placeshifted stream over a modern broadband connection, for example, sufficient bandwidth will typically be present to allow primary content to be streamed in relatively high definition format (e.g., resolution greater than about 1280×720 or so) with enough excess bandwidth to support a lower resolution secondary stream. A 5 MB/second network connection, for example, can typically support a high definition video stream using less than 90% or so of the available bandwidth, thereby leaving at least 10% or so available for a lower quality secondary stream. Even if user experiences several seconds (or so) of lower quality video when the secondary content is first selected, the content is nevertheless available on a substantially immediate basis, thereby greatly improving the viewer experience. As the secondary content becomes the primary content of subsequent viewing, a higher quality stream can be obtained for the newly-selected content, and a new secondary stream can be predicted and obtained.

Many media players that implement the features described herein will use multiple decoder modules to process the media streams that carry primary and secondary programs. Similarly, placeshifting devices could support simultaneous encoding of primary and secondary streams with multiple parallel encoders. Within the context of multi-encoder servers and multi-decoder clients, it may be very convenient to implement a picture-in-picture (PIP) or similar multi-stream viewing feature, thereby further enhancing the viewer experience. Several different embodiments and aspects of various embodiments are described in detail below.

Figure 1:
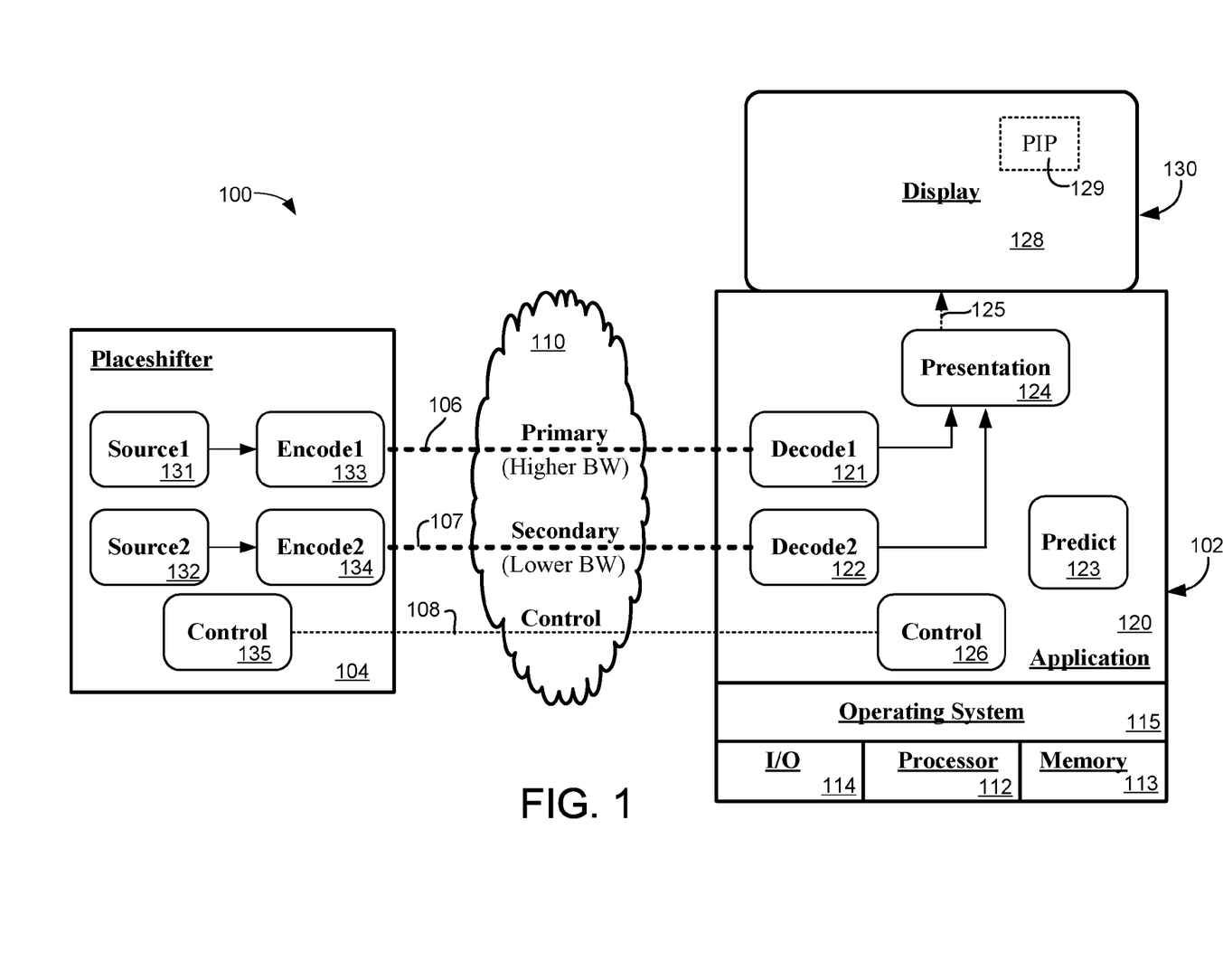
FIG. 1 is a block diagram of an exemplary placeshifting system that processes multiple simultaneous media streams.

Turning now to the drawings and with initial reference to FIG. 1, an exemplary system 100 provides a placeshifted primary media stream 106 from a placeshifting device 104 to a client media device 102 over a network 110. System 100 also shows a secondary media stream 107 that provides the secondary content that is predicted to be of interest to the user, as well as a control connection 108 that allows media device 102 to control the placeshifting device 104 and/or any external content sources as desired. Typically, the media device 102 provides content from the primary stream 106 as an output 125 to display 130. Display 130 then uses this output 125 to generate imagery 128 for presentation to the user, as appropriate. If the user subsequently selects content from secondary stream 107, media device 102 suitably changes output 125 so that decoded content from secondary stream 107 replaces the primary content in imagery 128. Secondary content could additionally or alternately supplement imagery 128, as in PIP window 129.

In a conventional placeshifting session, placeshifting device 104 receives an analog or digital content stream from one or more television receivers, video recorders and/or other content sources 131-132. The placeshifting device 104 encodes the received content into a format that is compatible with network 110, and transmits the encoded streams 106, 107 over network 110 to a suitable media player or other media device 102. The media device 102 is then able to receive, decode and render the received streams 106 and/or 107 as an output 125 to a display 130, as desired. Examples of general placeshifting systems and concepts are described in U.S. Pat. No. 7,707,614, although any number of other placeshifting system and techniques could be equivalently applied in other embodiments.

Placeshifting device 104 is any device, component or module capable of receiving media content from one or more content sources 131, 132 and of encoding the content for transmission on network 110. Generally speaking, a placeshifting device 104 receives content that would traditionally be presented on a television or other display at the same location as the placeshifting device 104, but that is instead provided as streaming content 106, 107 to a remote media device 102 via a local or wide area network 110.

Examples of placeshifting devices 104 that could be used in various embodiments may include any of the various hardware devices that are commercially available, such as any of the various SLINGBOX products available from Sling Media of Foster City, Calif. or any number of other sources. Other types of placeshifting devices 104 could include general purpose computers, servers or the like executing placeshifting software applications (e.g., the SLINGPROJECTOR application available from Sling Media). In some embodiments, placeshifting device 104 may be implemented virtually (e.g., using any number of server instances provided by a "cloud" service, a physical server system, and/or any other networked service). Still other placeshifting devices 104 could include hybrid devices such as set top boxes (STBs), television receivers, media players, digital video recorders (DVRs) and/or the like that integrate placeshifting features. One example of a hybrid product could be similar to the model VIP922 set top box available from Dish Network Corporation of Englewood, Colo., which integrates satellite and terrestrial broadcast receivers with digital video recorder (DVR) and placeshifting features. The particular commercial products referenced herein are intended solely as illustrative examples; other placeshifting products available from any number of other sources and manufacturers could be equivalently used.

The exemplary placeshifting device 104 shown in FIG. 1 includes a controller 105, one or more content sources 131-

132, and one or more encoders 133-134. In the example shown in FIG. 1, controller 105 is any sort of microprocessor, microcontroller, digital signal processor or other programmable hardware capable of directing the actions and processes of device 104. In various embodiments, device 104 is based upon a "system on chip" (SoC) implementation that incorporates a microcontroller with memory, input/output and other features to perform the various signal processing and other actions of device 104. Various SoC and other integrated hardware implementations are available from Texas Instruments, Conexant Systems, Broadcom Inc., and many other suppliers as appropriate. Other embodiments may implement controller 105 and/or the other features of device 104 with any number of discrete and/or integrated processing components (e.g., any sort of microprocessor or microcontroller), memories, input/output features and/or other features as desired. Still other embodiments may implement device 104 using a general purpose computer system that executes software to perform the various functions described herein.

Placeshifting device 104 obtains programming content from any number of internal or external program sources 131-132. Each program source 131-132 may represent, for example, a television receiver (e.g., a direct broadcast satellite (DBS), cable or terrestrial broadcast receiver), a digital video recorder (DVR), a media player, a network server, and/or any other source of media programming. In various embodiments, the two program sources 131-132 shown in FIG. 1 represent two separate television tuners that are each capable of separately receiving and decoding broadcast content from a DBS, cable and/or terrestrial source. Alternately, either or both program sources 131-132 may receive programming from a DVR, a network server and/or any other source of programming content.

Each program source 131-132 is typically controllable to tune to a desired channel, or to select desired programming in any manner. Program sources 131-132 may be integrated within the same chassis as placeshifting device 104, as in a STB that integrates television receivers, DVR capabilities, placeshifting capabilities, network communication and/or the like into a common appliance. Alternately, one or more program sources 131-132 may be external tuners, DVRs, STBs, media players or other components that provide content under the control of placeshifting device 104, as desired. In such embodiments, placeshifting device 104 typically provides radio frequency (RF), infrared (IR) or other commands that can be interpreted by the controlled program source 131-132 so that desired media programming can be provided from program source 131-132 to placeshifting device 104.

Content received from any internal or external program sources 131-132 is encoded as appropriate for transmission over network 110 to media device 102. Content streams 106, 107 may be encoded in any format such as Windows Media, Quicktime, Flash Media, MPEG, HTML5, Apple HTTP streaming and/or any other proprietary or non-proprietary formats as desired. Encoding may be provided by dedicated hardware (e.g., a dedicated encoder chip), by a dedicated encoder that is part of an SoC chip, by software executing on a general purpose processor, and/or in any other manner. In the exemplary embodiment shown in FIG. 1, two encoders 133-134 are shown so that content from programming sources 131-132 (respectively) can be simultaneously encoded. These parallel encoders 133-134 may be implemented using redundant encoding hardware in some embodiments, and/or by separate encoding processes executing in software. In some embodiments (e.g., legacy devices that may not have the ability to encode multiple simultaneous streams in hardware), a high quality primary stream 106 may be encoded using a relatively efficient hardware encoding device 133 while a lower quality secondary stream 107 may be encoded using a software encoding process 134. Other embodiments may use other types of encoding hardware, software and/or other logic, as desired.

Placeshifting device 104 operates by responding to commands received from a remotely-located media device 102 via network 110 to thereby provide a primary program stream 106 and a secondary program stream 107, as desired. The primary stream 106 typically provides the content that is selected by the user for placeshifted viewing on display 130, while the secondary stream 107 provides the predicted content that may be of near-term interest to the user, as described more fully below.

Network no may encompass any number of digital or other communications networks that allow multiple nodes (e.g., devices 102, 104) to communicate with each other using any common protocols, signaling schemes and/or the like. In various embodiments, network 110 encompasses one or more wired or wireless local area networks (LANs), wide area networks (WANs), and/or the like. Network 110 may also encompass the Internet, any cellular or other telephone network, and/or any other pubic or private networks as desired.

Media device 102 (also referenced herein as "media device 102") is any device, component, program or the like that is capable of receiving placeshifted content 106 and 107 from one or more placeshifting devices 104 via network 110. Client devices 102 may be variously implemented using any sort of portable or desktop computer systems, mobile telephones, tablet devices, media players and/or the like. In some embodiments, media device 102 may be implemented with special-purpose hardware such as the SLINGCATCHER product available from Sling Media, and/or any other products as desired.

To that end, media device 102 typically includes any sort of processor 112 that executes software instructions, along with associated memory 113 and conventional input/output features 114 such as a network interface, an interface to mass storage, an interface to display 130, interfaces to user input devices, and/or the like. In the embodiment shown in FIG. 1, media device 102 executes a placeshifting software application 120 that directs the various hardware features of media device 102 to perform the functions and to provide the features described herein. Application 120 typically interfaces with processor 112, memory 113 and input/output features 114 via any conventional operating system 115.

As shown in FIG. 1, application 120 suitably includes control logic 126 that processes user inputs to obtain placeshifted content streams 106, 107 from one or more remotely-located content sources 131, 132, to decode the received streams and to provide output signals 125 to a display 130 as appropriate. Control logic 126 typically establishes a control session 108 with the remote placeshifting device 104 that allows communication with controller 135 so that placeshifted streams 106, 107 can be established and maintained as desired.

Placeshifted media streams 106, 107 are decoded as appropriate. In the exemplary embodiment shown in FIG. 1, each stream 106, 107 is simultaneously decoded by a separate decoding module 121, 122 (respectively). Each decoding module 121, 122 may be implemented using specialized hardware, in some embodiments, although other embodiments will instead decode either or both of streams 106, 107 using software executing on processor 112 or the like. Decoded programming can be provided to a presentation module 124 that generates output signals 125 as desired to generate imagery 128 for viewing by the user. In some embodiments, presentation module 124 may be able to combine decoded programming from both primary and secondary streams 106, 107 to create a PIP image 129, or any other type of blended image as desired.

Display 130 is any television, video monitor or other display capable of presenting media imagery 128 to the user. In the exemplary embodiment shown in FIG. 1, display 130 provides imagery 128 in response to output signals 125 generated by software application 120 as appropriate. Some types of media devices 102 may incorporate a built-in display 130, such as the display in a laptop or other portable computer, a media player, a personal digital assistant and/or the like. In such embodiments, signals 125 are provided using a conventional video display interface or the like to generate imagery on the integrated display 130. In other embodiments wherein device 102 provides video output signals 125 to an external television or other display 130, such outputs 125 may be provided in any compatible format from any conventional display interface, such as component video, S-video, High-Definition Multimedia Interface (HDMI), Digital Visual Interface (DVI), IEEE 1394, and/or any other formats as desired.

In operation, control logic 126 suitably obtains programming in response to user inputs received at input/output features 114 of media device 102. Control logic 126 typically establishes a control connection 108 with the remote placeshifting device 104 via network no so that commands can be provided from control logic to controller 135. Controller 135 responsively controls program source 131 to obtain the selected programming. The obtained programming is encoded (using encoder 133) at an appropriate resolution, bit rate, frame rate or other quality parameters to generate primary stream 106. This stream 106 is transmitted from placeshifting device 104 to media device 102 via network 110, decoded, and provided as an output 125 to display 130 using conventional placeshifting techniques.

To reduce latency in changing channels or otherwise modifying the content of stream 106, various embodiments further provide a secondary stream 107 that encodes content that has not yet been requested by the user, but that is likely (or at least possible) to be requested in the near future. This secondary content can be predicted in any manner, as described below in conjunction with FIG. 3. In the example of FIG. 1, application 120 includes a prediction module 123 that predicts secondary content at the media device 102. The prediction function may be equivalently performed at the placeshifting device 104, at a separate server accessible via network 110, and/or in any other manner.

Secondary programming is obtained in any manner. In various embodiments, it may be difficult (if not impossible) to obtain multiple simultaneous programming streams from a single tuner, receiver or other program source 131. In such embodiments, the secondary content can be obtained from another program source 132 as desired. In other embodiments wherein program source 131 supports multiple simultaneous outputs (e.g., a DVR or other media source that allows simultaneous access to two previously recorded programs), both streams may be obtained from a common source 131. The secondary content is encoded (e.g., using encoder 134) and placeshifted as secondary stream 107 across network 110. As noted above, many embodiments may encode secondary stream 107 at a lower quality (e.g., reduced resolution, bit rate and/or frame rate) in comparison to primary stream 106 to reduce bandwidth consumption on network 110.

Media device 102 decodes secondary stream 107 in any manner. In some embodiments, primary stream 106 and secondary stream 107 are decoded simultaneously using parallel decoders 121 and 122 (respectively). After decoding, the secondary content is ready for substantially immediate presentation on display 130 if requested by the user. "Substantially immediate" in this sense means that the content does not need to be separately requested and obtained from the remote placeshifting device 104, since it is already present at the media device 102. Hence, any delay in switching from the primary content to the secondary content results from processing delays within device 102, rather than the much longer delays inherent in obtaining the content, encoding the content, and transmitting the content across network 110.

By obtaining a simultaneous stream 107 of content that is predicted to be of future interest to the user, then, media device 102 is able to substantially reduce latency in channel changes from the primary content to the secondary content. If the secondary content is accurately predicted, this reduction in latency can greatly improve the user experience. Moreover, by using a lower quality secondary stream 107, any adverse effects upon the primary stream 106 or the bandwidth of network no can be minimized.

Figure 2:
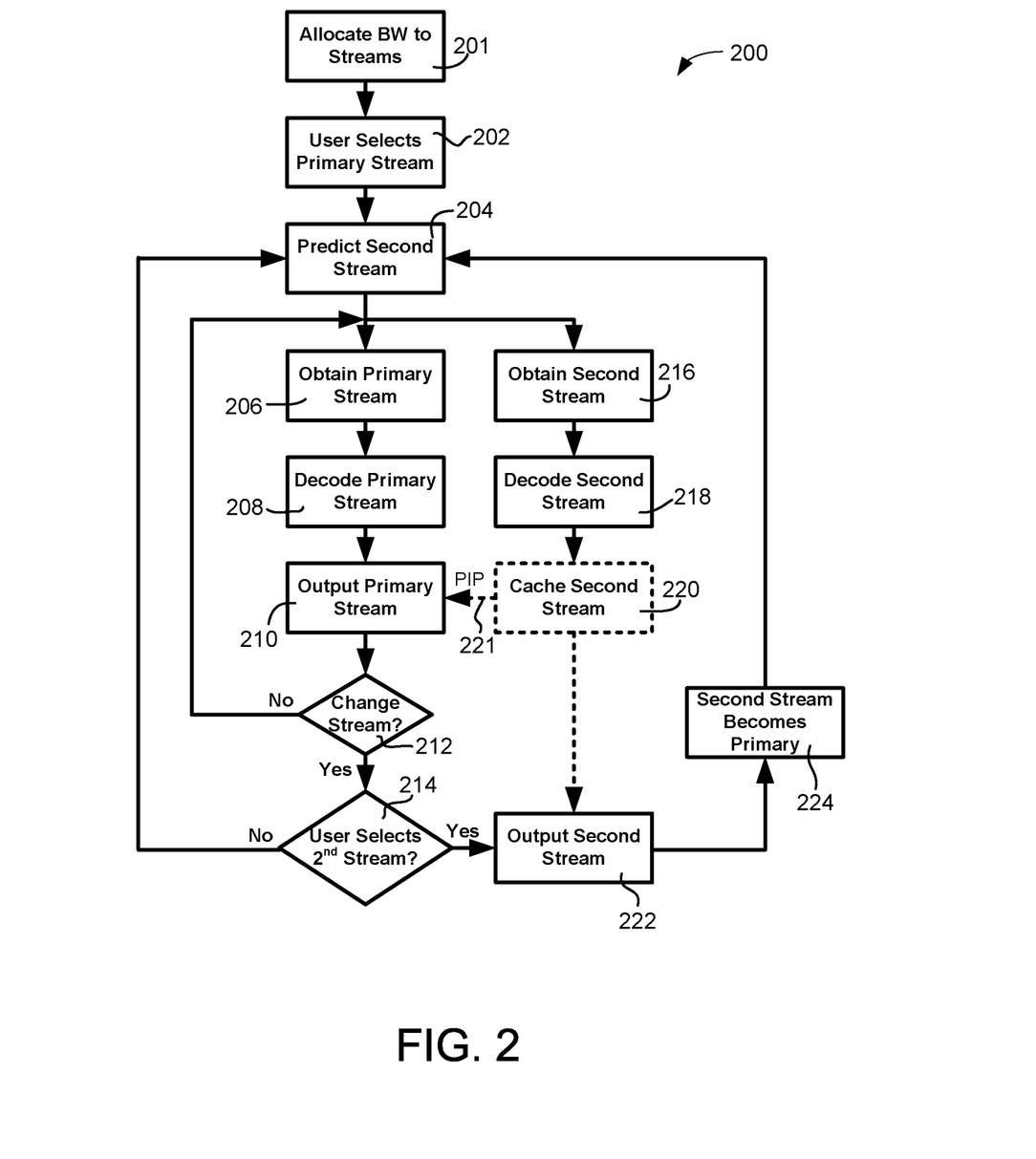
FIG. 2 is a diagram showing an exemplary method for processing multiple simultaneous media streams in a media device.

FIG. 2 shows an exemplary process 200 to placeshift primary and secondary content from placeshifting device 104 to media device 102. The user selects programming for the primary stream 106 (function 202), and secondary programming for the secondary stream 107 is predicted (function 204). The two separate streams 106, 107 are simultaneously obtained from the placeshifting device via the network (functions 206, 216) and decoded (functions 208, 218) as appropriate. If the user provides subsequent input that indicates a desire to select the secondary program that has already been received (function 214), then the secondary content can be readily output to the display (function 222). The secondary stream 107 then becomes the primary stream 106 during subsequent operation (function 224). Various other embodiments may supplement or modify the various functions shown in FIG. 2, and/or may organize the various functions in any other order.

Bandwidth can be allocated to primary and secondary stream 106, 107 in any manner (function 201). In various embodiments, application 120 allows the user to configure the relative "qualities" of streams 106, 107 as desired. Other embodiments may simply use default values based upon the type of network connection that is available, the observed condition of the network, and/or any other factors. In an exemplary embodiment, secondary stream 107 may be configured to use about 10% or so of the available bandwidth on network 110 so that 90% remains available for the primary stream 106. Other embodiments may use other allocation values, including equal allocation to the two streams 106, 107 and/or disabling the secondary stream 107 entirely, if dictated by network conditions, user preferences and/or other factors. The relative bandwidth consumption of the two streams 106, 107 may be adjusted by modifying the encoding parameters of the stream, such as the resolution, bit rate, frame rate or the like. Such parameters may be transmitted to placeshifting device 104 for storage as a user preference, if desired. Other embodiments may modify the settings or parameters in any other manner, or on any temporal basis.

The user selects the primary content for viewing on display 130 in any manner (function 202). In a typical embodiment, the user provides inputs using a touchpad, touchscreen, keyboard, mouse, remote control and/or other input device associated with media device 102. The input/output features 114 of media device 102 relay the inputs to control logic 126 via operating system 115 or the like. Inputs from the user can be received and processed in any manner.

Secondary content that is likely to be of near-term interest to the user can be predicted in any manner (function 204). As noted above, prediction logic 123 at media device 102 could directly predict the secondary content in some embodiments. Equivalent embodiments could perform the predicting function 204 at placeshifting device 104, at a server accessible via network 110, or at any other location. Various techniques for predicting secondary content that is likely to be of near-term interest to the user are described below with reference to FIG. 3.

Two media streams 106, 107 that encode the primary and secondary content are simultaneously obtained (functions 216, 218) as noted above. The primary stream 106 is generally received from placeshifting device 104 using conventional techniques. Secondary stream 107 may be similarly obtained from placeshifting device 104, noting again the quality of secondary stream 107 may be reduced in comparison to stream 106 to preserve bandwidth. In various embodiments, the streams 106, 107 are obtained in response to commands issued by control logic 126 and processed by controller 135 as described above, although other embodiments could obtain streams 106, 107 in any other manner.

The obtained streams 106, 107 may be decoded in any manner (functions 208, 218). As noted above, the primary and secondary streams may be simultaneously decoded using parallel hardware or software decoders 121, 122 in some embodiments. Other embodiments could delay decoding of the secondary stream 107 (function 218) and simply cache the still-encoded secondary stream 107 until the user selects the secondary content. The cached stream 107 could then be decoded later in response to the user selection of the secondary content. This delayed decoding could reduce or eliminate the need for a second decoder 122, although some latency from the decoding process would still be present.

Secondary content is cached or otherwise maintained (e.g., in memory 113 or other digital storage) for an appropriate period of time (function 220). The cache time can be determined in any manner, but will typically be sufficient to store enough programming so that playback of the secondary content can begin substantially immediately and continue without interruption until a primary stream containing the same programming can be obtained from placeshifting device 104. In many embodiments, it may be desirable to at least cache five to ten seconds of secondary content, although other embodiments could cache more or less, as desired.

The user-selected content that is decoded from primary stream 106 is output to display 130 in any manner (function 210). As noted above, some embodiments with built-in displays 130 will simply render imagery generated by presentation logic 124 in response to signals 125 provided to a video interface or the like. Other embodiments may equivalently provide signals 125 from an interface to an external television or other display 130, as desired. Display 130 is then able to present imagery 128 to the user, as desired.

In some embodiments, content from secondary stream 107 can be output to display 130 as desired (function 221). This feature may be useful in generating PIP or other hybrid displays, for example. Typically, presentation logic 124 in application 120 will generate output signals 125 that represent imagery obtained either or both of streams 106, 107 to generate output signals 125 for display 130, as appropriate.

The primary and secondary streams 106, 107 are simultaneously and continuously obtained from placeshifting device 104 until the user changes channel, or otherwise modifies the primary content presented on display 130 (function 212). When the user provides further inputs to media device 102 that indicate desired changes, the primary and secondary streams 106, 107 are modified as appropriate. If the user selects new programming other than the cached secondary programming (function 214), then a new secondary stream 107 is predicted (function 204), and the new primary and secondary streams 106, 107 are obtained as described above. Even if the newly-selected content is different from the predicted secondary content, the additional information obtained during subsequent changes by the user can be used to improve future predictions. That is, even if the secondary content is not correctly predicted in a first iteration of process 200, subsequent iterations of prediction function 204 can use the additional data about the user's actual content selections to improve later predictions. Subsequent user inputs can be used to predict patterns in the user's behavior, for example, as described more fully below.

If the user selects the secondary content that has been previously received and stored, however, then such content can be very quickly provided as the output 125 to display 130 (function 222). Since the content is already received from the placeshifting device 104, there is no need to wait for the content to be selected, encoded and transmitted across network 110, thereby allowing for output to display 130 on a substantially immediate basis. Further, in embodiments that simultaneously decode primary and secondary streams 106, 107 prior to caching function 220, the decoded secondary content can be very quickly played back from the cache, thereby substantially reducing (if not eliminating) the latency perceived by the user.

After the secondary content is selected by the user (function 214), the secondary content is played back until a new primary stream 106 that incorporates the same programming can be obtained (function 224). That is, after the secondary content is selected by the user, it becomes the new primary content, and new secondary content is predicted. The new primary and secondary streams 106, 107 are obtained as described above. In embodiments wherein the secondary stream 107 is encoded at lower quality than the primary stream 106, the viewer may observe the degraded quality for a few seconds until a higher quality stream 106 can be obtained. Because the secondary content is already obtained and/or decoded, however, the latency to provide the secondary content is substantially reduced, thereby improving the overall user experience.

Each of the processing functions shown in FIG. 2 may be implemented in hardware, software and/or firmware logic, as appropriate. The various functions performed by the media device 102, for example, may be carried out in response to software instructions (e.g., application 120) stored in memory 113 and executed by processor 112 or the like.

Figure 3:
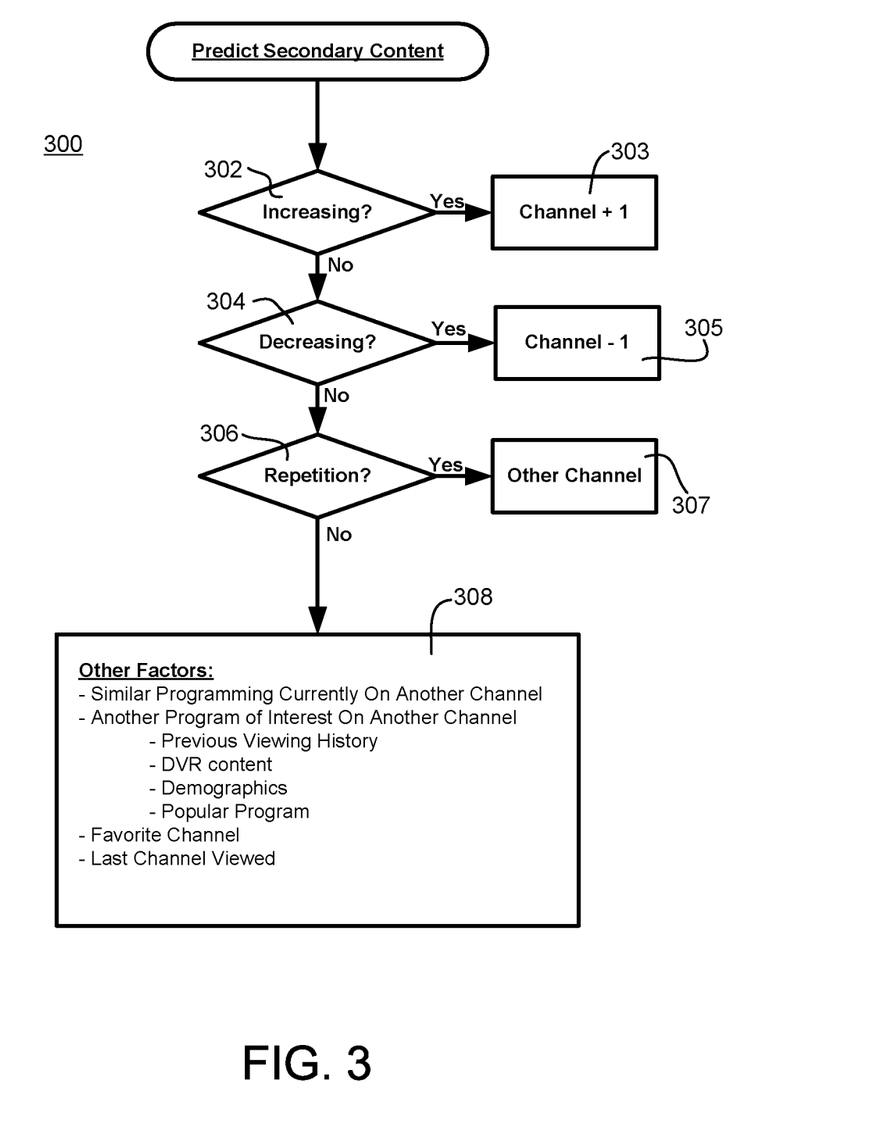
FIG. 3 is a flowchart of an exemplary technique to choose a media program to receive in a secondary media stream.

The secondary content obtained in secondary stream 107 may be predicted in any manner. FIG. 3 shows an exemplary process that may be performed at media device 102 (e.g., using prediction logic 123 in application 120), at placeshifting device 104, at a server accessible to media device 102 and/or placeshifting device 104 via network 110, or at any other processing source. Generally speaking, secondary content may be predicted by considering the primary content, the user's recent actions, the user's viewing history, and/or any other factors as desired. Secondary content may be predicted using any other techniques, including those not described in FIG. 3 or elsewhere herein.

FIG. 3 shows an exemplary process 300 for predicting secondary content that considers any patterns in the user's recent changes, and attempts to anticipate such changes (functions 302-307). If no pattern can be readily identified, than any number of other factors may be considered as desired (functions 308). Other embodiments may consider additional or alternate factors and/or may organize the factors shown in FIG. 3 in any other logical manner.

Patterns in user behavior can indicate whether the user is channel surfing in a particular direction (functions 302-305), switching between two channels (functions 306-307), or taking any other actions as desired. By storing and comparing multiple user inputs over time, it can be readily determined if the user is linearly changing channels in an increasing (function 302) or decreasing (function 304) manner. If recent inputs indicate that the user is sequentially viewing increasing or decreasing channel numbers, for example, then the next channel in the sequence can be predicted as secondary stream 107 (functions 303 and 305, respectively) to reduce latency if the viewer continues on the same pattern. Similarly, if a viewer is repeatedly switching between two (or more) channels (function 306), then the other channel can be obtained as the secondary stream 107. If a viewer is switching between two different programs, for example, programming streams 106, 107 for the two channels can be simultaneously received, thereby greatly reducing latency for each switch. Other patterns in the viewer's recent surfing history can be observed and used to predict secondary content, as desired.

If no pattern can be detected in the user's surfing history, then other factors may be considered (function 308). Such other factors may include, without limitation, historical data about the user's habits or preferences, demographic data about the user, electronic program guide (EPG) data about a particular program or channel, or the like.

In some embodiments, secondary content may be simply selected correspond to a viewer's favorite channel. In such cases, the content from the user's favorite channel could be obtained as secondary stream 107 regardless of the primary programming being viewed. The favorite channel may be expressly configured by the user in some embodiments. Alternately, the favorite channel may be determined by the user's prior viewing history, as determined from the media device 102, placeshifting device 104 and/or any other source.

Other embodiments may determine the secondary content based upon the primary content being watched. The secondary content may be selected to contain similar programming as the primary content, for example, as determined from EPG data or the like. If the user is determined to be watching a particular football match, for example, the secondary content may be determined to be another football match that is currently playing on another channel in anticipation of the user's desire to watch more than one match simultaneously.

Other embodiments may attempt to predict the user's future program choices based upon information about the user. In some implementations, the information may be demographic in nature (e.g., persons of a certain demographic may be known to enjoy a particular program that could be selected as the secondary stream). Alternately, programs of interest to the user could be predicted based upon the user's viewing history, the contents of the user's DVR, or the like. Such predictions may consider the current date and time, and/or any other factors as desired. For example, if a new episode of a program that the viewer watched at the same time last week is identified, this program may be predicted as a program that may be of interest to the user.

Still other embodiments may simply predict programs that are known to be popular with the general populace, or with the user's particular demographic. If a very popular program is currently being broadcast, for example, this program may be obtained as secondary content even though the user is watching a different program.

The various techniques for predicting the user's future program selections may be inter-combined or otherwise modified in any manner. FIG. 3, for example, shows a process 300 that first attempts to recognize patterns in the user's surfing history, and that reverts to other factors only if no pattern is recognized. Other embodiments could eliminate pattern recognition altogether, or could use pattern recognition as a secondary consideration if the other factors in function 308 were in determinate. Further, the various other factors described herein may be considered in any logical manner. Function 308, for example, could initially consider whether similar programming (e.g., another sporting match similar to a currently viewed match) is currently broadcast. If no such program is found, other programs known to be of interest to the viewer (based on DVR or historical data) could be considered. If no other programs of interest can be readily identified, then a known popular program could be selected, or the viewer's favorite channel or even the last channel viewed could be selected if no other options are readily available. Again, any number of different techniques for predicting the user's next channel change could be used and/or combined in any number of alternate embodiments.

Accordingly, new systems and techniques are presented for improving the viewer's placeshifting experience by reducing the latency in changing programs. By predicting secondary programs that are likely to be of near-term interest to the viewer and obtaining such secondary programming prior to the user's request, the content can be provided very quickly upon subsequent request by the user. This reduction in latency greatly improves the user experience. Other embodiments may use equivalent systems and techniques to provide any other benefits, as desired.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by a media device that is associated with a display and that communicates with a placeshifting device to obtain live television programming via a network, the method comprising:
    receiving a first user input at the media device that selects a media stream encoded by the placeshifting device that contains a channel of live television programming for viewing on the display;
    predicting, by the media device, a predicted media stream available from the placeshifting device that contains content from a different channel of the live television programming so that the content of the predicted media stream is different from the content of the selected media stream;
    communicating with the placeshifting device via the network to thereby direct the placeshifting device to encode the selected media stream and the predicted media stream and to simultaneously obtain both the selected media stream and the predicted media stream from the placeshifting device via the network, wherein the media device directs the placeshifting device to encode the predicted media stream is to have a lower quality than the selected media stream so that the predicted media stream consumes less bandwidth on the network than the selected media stream when the selected media stream and the predicted media stream are simultaneously transmitted on the network from the placeshifting device to the media device;

outputting the selected media stream to the display while continuing to receive the second media stream; and in response to a subsequent second user input that selects the predicted media stream, the media device switching from the selected media stream to output the lower quality predicted media stream received from the placeshifting device to the display; and the media device configuring the relative qualities of the selected media stream and the predicted media stream encoded by the placeshifting device based upon a third user input to thereby adjust the amount of bandwidth consumed by the selected media stream relative to an amount of bandwidth consumed by the predicted media stream when the two streams are simultaneously transmitted from the placeshifting device to the media device on the network.

2. The method of claim 1 wherein the predicted media stream is at least partially obtained by the media device prior to the second user input so that content from the predicted media stream is output to the display on a substantially immediate basis after the second user input that selects the predicted media stream is received.

3. The method of claim 1 further comprising simultaneously decoding the selected media stream and the predicted media stream.

4. The method of claim 3 wherein the obtaining and the decoding of the predicted media stream occurs prior to the second user input.

5. The method of claim 1 wherein the predicting comprises determining a user input pattern, and choosing the predicted media stream that is consistent with the user input pattern.

6. The method of claim 5 wherein the user input pattern is determined based upon the first user input and any other user inputs obtained prior to the first user input.

7. The method of claim 1 wherein the predicting comprises choosing the predicted media stream that is likely to be of interest to a user based upon the user's viewing history.

8. The method of claim 1 wherein the predicting comprises choosing, as the predicted media stream, a program broadcast on at least one of a last channel viewed and a user favorite channel.

9. The method of claim 1 wherein the predicted media stream is obtained in a lower bandwidth format prior to the second user input, and wherein the predicted media stream is obtained in a higher bandwidth format after the second user input that selects the predicted media stream.

10. A method executable by a media player device that is associated with a display and that communicates with a placeshifting device via a network to obtain media programs encoded by the placeshifting device, the method comprising:

receiving a first input from a user at the media player device that selects a media program available from the placeshifting device for viewing on the display;

predicting, by the media player device, a second media program available from the placeshifting device, wherein the second media program is different from the selected media program and is chosen based upon prior actions by the user;

directing the placeshifting device to thereby simultaneously encode the selected media program into a first placeshifted media stream and the second media program into a second placeshifted media stream, wherein the media player device directs the placeshifting device to encode the second placeshifted media stream in a lower bandwidth format than the first placeshifted media stream so that the second placeshifted media stream consumes less bandwidth on the network than the first placeshifted media stream when the first and second placeshifted media streams are simultaneously transmitted to the media player device on the network;

simultaneously decoding the selected media program and the second media program from the first and second media streams, respectively;

initially outputting only the selected media program to the display; and while the selected media program is being output to the display, receiving a second input from the user that selects the second media program; and in response to the second input from the user, outputting the second media program previously decoded from the lower bandwidth format to the display to thereby replace the presentation of the selected media program on a substantially immediate basis.

11. The method of claim 10 wherein the predicting comprises determining a user input pattern based upon the first user input and any other user inputs obtained prior to the first user input, and choosing the second media program that is consistent with the user input pattern.

12. The method of claim 10 wherein the previously-decoded second media program is initially output to the display in the lower bandwidth format in response to the second input from the user, and wherein the second media program is subsequently obtained from the placeshifting device in a higher bandwidth format as the first placeshifted media stream.

13. The method of claim 10 further comprising the media player device configuring the relative qualities of the selected media stream and the second media stream encoded by the placeshifting device based upon a third input from the user to thereby adjust the amount of bandwidth consumed by the second media program relative to amount of bandwidth consumed by the selected media program when the two streams are simultaneously transmitted on the network.

14. A media device that communicates with a placeshifting device via a network to obtain media streams containing live television programs that are encoded by the placeshifting device, the media device comprising:

a first interface to the network;

a second interface to a display; and a processor coupled to the first and second interfaces, wherein the processor is configured to process a first input from a user that selects a first live television program available from the placeshifting device, to predict a second live television program that is also available from the placeshifting device that has content that is different from the content of the first media stream and that is likely to be of interest to the user, to direct with the placeshifting device to simultaneously encode a first media stream that contains the first live television program and a second media stream that encodes the second live television program, to simultaneously obtain both the first media stream and the second media stream from the placeshifting device via the network, to initially output the first media stream to the display, and to replace the output of the first media stream with the output of the second media stream in response to a second input from the user that selects the second media stream, wherein the media device directs the placeshifting device to encode the first and second media streams so that the second media stream has a lower quality than the first media stream so that the second media stream consumes less bandwidth on the network when the first and second media streams are simultaneously transmitted over the network.

15. The media device of claim 14 wherein the media device is further configured to simultaneously decode the first and second media streams, and wherein the obtaining and the decoding of the first and second media streams occurs prior to the second user input.

16. The media device of claim 14 wherein the processor is further configured to determine a user input pattern, and to choose the second media stream that is consistent with the user input pattern.

17. The media device of claim 16 wherein the processor is further configured to determine the user input pattern based upon the first user input and any other user inputs obtained prior to the first user input.

18. The media device of claim 14 wherein the placeshifting device is a user-operated device that is located in a home associated with the user.

19. The media device of claim 14 wherein the relative qualities of the first and second media streams encoded by the placeshifting device are adjustable by the media device based upon a third user input to the media device that adjusts the relative bandwidths consumed by the two media streams when the two media streams are simultaneously transmitted from the placeshifting device to the media device on the network.

* * * * *